United States Patent
Tuan et al.

(10) Patent No.: US 10,051,452 B2
(45) Date of Patent: Aug. 14, 2018

(54) NOTIFICATION SYSTEM AND METHOD OF ENVIRONMENT ABNORMALITY

(71) Applicant: InnoLux Corporation, Miao-Li County (TW)

(72) Inventors: Hsing-Chien Tuan, Miao-Li County (TW); Wen-Jyh Sah, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 15/389,865

(22) Filed: Dec. 23, 2016

(65) Prior Publication Data

US 2017/0208445 A1    Jul. 20, 2017

(30) Foreign Application Priority Data

Jan. 20, 2016   (TW) .............................. 105101774 A

(51) Int. Cl.

| H04M 11/04 | (2006.01) |
|---|---|
| H04W 4/90 | (2018.01) |
| H04W 4/22 | (2009.01) |
| H04W 4/02 | (2018.01) |
| G08B 21/10 | (2006.01) |
| H04W 84/18 | (2009.01) |

(52) U.S. Cl.
CPC ............. *H04W 4/90* (2018.02); *G08B 21/10* (2013.01); *H04W 4/027* (2013.01); *H04W 4/22* (2013.01); *H04W 84/18* (2013.01)

(58) Field of Classification Search
CPC ......... H04W 4/02; H04W 4/22; H04W 64/00; H04W 76/007

USPC ................................ 455/404.1, 404.2, 456.1
See application file for complete search history.

(56) References Cited

U.S. PATENT DOCUMENTS

| 2015/0051837 A1* | 2/2015 | Kelley | ..................... G01V 1/28 |
|---|---|---|---|
| | | | 702/3 |
| 2015/0153477 A1* | 6/2015 | Wikelski | ................ G01V 1/008 |
| | | | 702/3 |

FOREIGN PATENT DOCUMENTS

CN        102508288 B      9/2013

* cited by examiner

*Primary Examiner* — Temica M Beamer
(74) *Attorney, Agent, or Firm* — Muncy, Geissler, Olds & Lowe, P.C.

(57) ABSTRACT

A notification system of environment abnormality includes a network system, a plurality of sensors, a judgment system, and an abnormality notification system. The sensors are configured to a plurality of individuals, respectively, and capable of collecting position data of the individuals through the network system. The judgment system includes an identification unit and a biological information database containing a plurality of behavior data. The behavior data include at least a normal behavior information and an abnormal behavior information of a creature. The identification unit receives the position data of the individuals from the sensors. The abnormality notification system communicates with the identification unit. The identification unit processes the position data and then compares the position data with the behavior information stored in the biological information database. When the position data match the abnormal behavior information, the identification unit notifies the abnormality notification system to output an environment abnormality notification.

18 Claims, 3 Drawing Sheets

NOTIFICATION SYSTEM AND METHOD OF ENVIRONMENT ABNORMALITY

CROSS REFERENCE TO RELATED APPLICATIONS

This Non-provisional application claims priority under 35 U.S.C. § 119(a) on Patent Application No(s). 105101774 filed in Taiwan, Republic of China on Jan. 20, 2016, the entire contents of which are hereby incorporated by reference

BACKGROUND

Technical Field

The present disclosure relates to a notification system and, in particular, to a notification system of environment abnormality.

Related Art

Most animals are very sensitive to changes of their living environments. Sometimes, the wild animals may have unusual behaviors before some significant changes in the natural environment or abnormal disasters. For example, the wild snakes will migrate before the earthquake, and the dogs will continuously bark before the earthquake. Accordingly, it is possible to observe the aforementioned animal behaviors and to issue a natural disaster auxiliary warning message when the observed animals have abnormal habits or behaviors.

Since the IOT (internet of thing) technology has been developed, it can be applied to replace the conventional way of observing animal behaviors by humans.

One conventional method to predict an earthquake needs to perform the image identification and conversion to obtain the animal behaviors before analyzing whether the animals have abnormal habits or behaviors. The requirement of image identification and conversion are time consuming, and the analyzing cost is high. Moreover, the analyzing results may not be used to predict the earthquake in time or might not be reliable enough. Therefore, it is desired to develop a notification system of environment abnormality that can rapidly and intuitively monitor the environment abnormality.

SUMMARY

In view of the foregoing, an objective of the disclosure is to provide a notification system and method of environment abnormality that can rapidly and intuitively monitor the environment abnormality.

The present embodiment discloses a notification system of environment abnormality, which includes a network system, a plurality of sensors, a judgment system, and an abnormality notification system. The sensors are configured to a plurality of individuals of at least one creature, respectively, and collect position data of the individuals through the network system. The judgment system includes an identification unit and a biological information database. The biological information database contains a plurality of behavior data, which include at least a normal behavior information and an abnormal behavior information of the creature. The identification unit receives the position data of the individuals from the sensors. The abnormality notification system communicates with the identification unit. The identification unit compares the position data of the individuals with the behavior information stored in the biological information database. When the position data of the individuals match the abnormal behavior information, the identification unit notifies the abnormality notification system to output an environment abnormality notification.

The present embodiment also discloses a notification method of environment abnormality, including the following steps of: collecting position data of a plurality of individuals of at least one creature by a plurality of sensors configured to the individuals, respectively, through a network system; sending the position data of the individuals collected by the sensors to a judgment system, wherein the judgment system comprises an identification unit and a biological information database, the biological information database contains a plurality of behavior data, the behavior data comprise at least a normal behavior information and an abnormal behavior information of the creature, and the identification unit receives the position data of the individuals from the sensors; processing the position data of the individuals by the identification unit, and comparing the position data of the individuals with the behavior information stored in the biological information database; and if the position data of the individuals match the abnormal behavior information, notifying an abnormality notification system to output an environment abnormality notification.

As mentioned above, the notification system and method of environment abnormality of the embodiment collect the position data of individuals by the sensors through a network system (e.g. IOT system), and the activities or movements of the group of animals can be monitored in real time and the required information can be rapidly retrieved. In addition, the identification unit can compare the position data of the individuals with the behavior information stored in the biological information database. If the position data of the individuals match the abnormal behavior information, the identification unit notifies the abnormality notification system to output an environment abnormality notification. Compared to the conventional art that observes the activities of animals by images, the notification system and method of environment abnormality of the embodiment can directly retrieve the desired information without the complex image identification and conversion, thereby reducing the total calculation time and decreasing the misjudgment.

In one embodiment, the notification system of environment abnormality further includes a machine learning system, a correction unit and an environment information feedback system. The correction unit can determine whether the judgment result of the abnormality notification system matches the real situation or not, and the machine learning system can perform the feedback control and modify the behavior data stored in the biological information database. For example, the weights of the normal behavior information and the abnormal behavior information in the biological information database can be modified according to the feedback information. Accordingly, the judgments for the future events can be more correct.

BRIEF DESCRIPTION OF THE DRAWINGS

The embodiments will become more fully understood from the detailed description and accompanying drawings, which are given for illustration only, and thus are not limitative of the present embodiment, and wherein.

DETAILED DESCRIPTION OF THE INVENTION

The embodiments will be apparent from the following detailed description, which proceeds with reference to the accompanying drawings, wherein the same references relate to the same elements.

Figure 1:
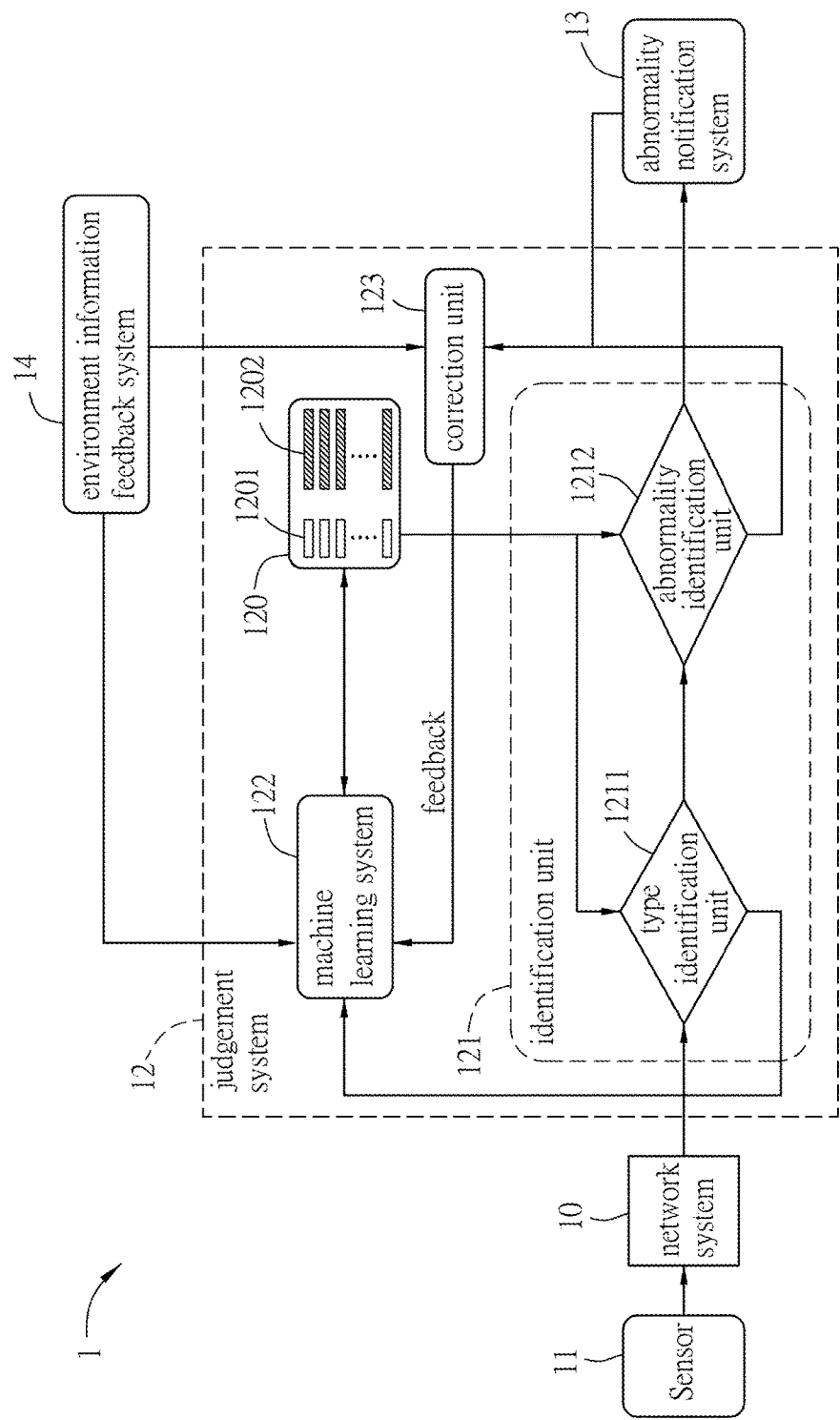
FIG. 1 is a schematic structural diagram of a notification system of environment abnormality according to an embodiment of the invention.

FIG. 1 is a schematic structural diagram of a notification system of environment abnormality according to an embodiment of the invention. The notification system 1 of environment abnormality includes a network system 10, a plurality of sensors 11, a judgment system 12, and an abnormality notification system 13.

Figure 2:
FIG. 2 is a schematic diagram showing the configurations of the sensors according the embodiment of the invention.

FIG. 2 is a schematic diagram showing the configurations of the sensors according the embodiment of the invention. The sensors 11 are configured respectively to a plurality of individuals of a creature D, and collect position data of the individuals through the network system 10. The sensors 11 can be active sensors or passive sensors. The type and communication protocol of the network system 10 are determined based on the type of the sensors 11. The creature D configured with the sensors 11 can be any kind of animals, such as birds, snakes or dogs. The position data of the individuals collected by the sensors 11 can include the moving frequency, time, and number of the creature D. The network system 10 can be an IOT structure, which utilizes the IPv6 communication protocol.

The active sensor has a power source. For example, the active sensor may be a wireless radio frequency identification module (or active RFID tag) configured with internal battery or a wireless communication module configured with internal battery, such as a BLE (bluetooth low energy) module, a WiFi direct module, a GPS communication module or a ZigBee communication module. The power source of the active sensor can be the internal battery or a module for converting the external energy (e.g. solar energy, kinetic energy or pressure) into electricity for the wireless communication module.

The passive sensor can be a passive RFID tag or a semi-passive RFID tag. If the sensor 11 is a passive RFID tag, it is unnecessary to configure the internal battery, and the RFID antenna circuit can receive the wireless RF energy from the RFID reader for providing the electricity to enable the passive RFID tag. If the sensor 11 is a semi-passive RFID tag, it is configured with a small battery for driving the tag circuit to operate. In this configuration, the RFID antenna does not need to receive the electromagnetic wave signal, and it can be fully used to send signals. Therefore, compared to the passive RFID tag, the semi-passive RFID tag has a faster response rate and better operation efficiency.

When the sensor 11 is configured with a wireless communication module, such as the BLE module, WiFi direct module, GPS communication module or ZigBee communication module, the outputted signal is the position signal indicating the location of the wireless communication module. Accordingly, this position signal can indicate a position data of the animal configured with the sensor 11. Besides, it is also possible to build a certain number of wireless access points at specific locations within the range to be detected for relaying the position signals outputted from the wireless communication modules. In this case, the type of the network system 10 and the numbers and density (or the distance between two wireless access points) of the configured wireless access points are determined according to the type of the wireless communication module. For example, if the wireless communication module is a BLE module, the network system 10 adapts the Bluetooth wireless communication protocol. The related technical information is well known by the skilled persons in the art, so the detailed descriptions thereof will be omitted.

When the sensor 11 is configured with a wireless RF module, such as the active RFID tag, the passive RFID tag or the semi-passive RFID tag, the outputted signal is the identification information stored in the RFID tag. Accordingly, it is necessary to build a certain number of RFID readers at specific locations within the range to be detected for receiving the identification information outputted from the sensor 11 and transmitting it to the remote host. The information transmitted from the RFID readers includes the identification information of the sensor 11 and the location of the RFID reader. Thus, the information received by the remote host can indicate the position data of the creature D configured with the sensor 11. Besides, the numbers and density (or the distance between two RFID readers) of the configured RFID readers are determined according to the type of the RFID tags. The related technical information is well known by the skilled persons in the art, so the detailed descriptions thereof will be omitted.

The judgment system 12 includes an identification unit 121 and a biological information database 120. The biological information database 120 contains a plurality of behavior data, which include at least a normal behavior information 1201 and at least an abnormal behavior information 1202 of the creature D. The identification unit 121 receives the position data of the individuals from the sensors 11. The abnormality notification system 13 communicates with the identification unit 121 of the judgment system 12.

After receiving the position data of the individuals from the sensors 11 through the network system 10, the identification unit 121 compares the position data of the individuals with the behavior information stored in the biological information database 120. When the position data of the individuals match at least one of the abnormal behavior information 1202 stored in the biological information database 120, the identification unit 121 notifies the abnormality notification system 13 to output an environment abnormality notification.

Referring to FIG. 1, in order to enhance the processing performance of the judgment system 12, the identification unit 121 includes a type identification unit 1211 and an abnormality identification unit 1212. The type identification unit 1211 determines that whether the received position data of the individuals match the behavior data stored in the biological information database 120 or not. In other words, the type identification unit 1211 determines in advance that whether the judgment system 12 is capable of recognizing the collected position data of the individuals or not. If the type identification unit 1211 determines that the judgment system 12 is capable of recognizing the collected position data, the position data of the individuals are then transmitted to the abnormality identification unit 1212 to be determined that whether the position data of the individuals represent an environment abnormality event or not.

In more detailed, when the identification unit 121 receives the position data of the individuals outputted by the sensor 11 through the network system 10, the type identification unit 1211 processes the collected position data of the individuals to generate a moving type data and then compares the moving type data with the behavior data stored in the biological information database 120. If the moving type data match one of the behavior data stored in the biological information database 120, the moving type data are sent to the abnormality identification unit 1212.

Next, the abnormality identification unit 1212 compares the moving type data with the abnormal behavior information 1202. If the moving type data match any one of the abnormal behavior information 1202, the abnormality identification unit 1212 notifies the abnormality notification system 13 to output the environment abnormality notification. That is, the type identification unit 1211 filters out the position data of the individuals that can be recognized by the judgment system 12, and then the filtered position data of the individuals are compared with the abnormal behavior information 1202 to determine whether the position data of the individuals indicate an environment abnormality event or not. If the answer is positive, the abnormality identification unit 1212 outputs a signal to notify the abnormality notification system 13 to output the environment abnormality notification. The environment abnormality notification can notify the user that an environment abnormal event is going to happen, and the related persons can be aware and execute the related emergency actions.

In order to increase and expand the identification ability of the judgment system 12, the judgment system 12 further includes a machine learning system 122 and a correction unit 123. Besides, the notification system 1 of environment abnormality further includes an environment information feedback system 14. The machine learning system 122 can be a neural network learning system or fuzzy model learning system.

If the moving type data generated by the type identification unit 1211 does not match any of the behavior data stored in the biological information database 120, the type identification unit 1211 will send the moving type data to the machine learning system 122, and the machine learning system 122 records the moving type data into the biological information database 120. Accordingly, the judgment system 12 can judge the same events next time, and the abnormality identification unit 1212 can further determine the event as a normal situation or an abnormal situation.

Furthermore, in order to enhance the accuracy of the judgment system 12, the correction unit 123 receives an environment information from the environment information feedback system 14, and compares the environment information with an environment event information sent from the identification unit 121 or the abnormality notification system 13 to the correction unit 123. If the environment event information does not match the environment information, a feedback information is sent to the machine learning system 122, and the machine learning system 122 modifies the behavior data stored in the biological information database 120 according to the feedback information. The environment information may include the natural environment information containing the meteorological, geological, hydrological information collected by the environment information feedback system 14 within the range to be detected. For example, the natural environment information may include the temperature, rainfall, wind direction, wind strength, earthquakes, tsunamis, typhoons, or forest fires, which are published by the local government. Besides, the environment information may also include the activities of humans or other animals within the range to be detected. For example, the environment information may include the local development application information provided by the local government, such as the forestry, mining, transportation construction and other information. This embodiment is not limited thereto. The environment event information is the judgment result of the judgment system 12 based on the above comparison and the collected position data of the individuals. For example, the judgment system 12 may determine that an earthquake is going to happen in the detected region.

After the abnormality identification unit 1212 of the identification unit 121 compares the moving type data with the behavior data, if the moving type data match the normal behavior information 1201, the abnormality identification unit 1212 transmits the judgment result (the environment event information) to the correction unit 123. Then, the correction unit 123 compares the environment information received from the environment information feedback system 14 and the environment event information received from the abnormality identification unit 1212. If the judgment result of the abnormality identification unit 1212 (the environment event information) does not match the environment information, an environment phenomenon corresponding to the environment event information does happen.

For example, if the system has observed that more than 50% of hibernation snakes in the region to be detected have moved out of the caves, the abnormality identification unit 1212 will compare the behavior data of snakes within the region to the biological information database 120, and determine that there was a warm air flows through this region causing the local temperature increased over the activity temperature (4° C.) of snakes. Accordingly, the snakes are fooled to end the hibernation. This situation matches the normal behavior information 1201, and it is determined that the environment event is normal. Then, the abnormality identification unit 1212 sends this judgment result (the environment event information) to the correction unit 123. The correction unit 123 will further receive the environment information sent from the information feedback system 14. If the environment information sent from the information feedback system 14 to the correction unit 123 indicates that there are drastic changes in the earth's crust within this region, the judgment result (the environment event information) does not match the environment information indicating that there is an earthquake in this region.

Besides, after the abnormality identification unit 1212 of the identification unit 121 compares the moving type data with the behavior data, if the moving type data match the abnormal behavior information 1202 stored in the biological information database 120, the abnormality behavior information 1202 notifies the abnormality notification system 13 to output an environment abnormality notification. Moreover, the abnormality notification system 13 further sends this event (the environment event information) to the correction unit 123. The correction unit 123 can compare the environment information received from the environment information feedback system 14 with the environment event information received from the abnormality notification system 13. If judgment result of the abnormality notification system 13 (the environment event information) does not match the environment information, an environment phenomenon corresponding to the environment event information does happen.

For example, if the system has observed that more than 50% of hibernation snakes in the region to be detected have moved out of the caves, the abnormality identification unit 1212 will compare the behavior data of snakes within the region stored in the biological information database 120. If the information indicates that the local air temperature and airflow are normal and the geological temperature is also normal, which means the temperature in the caves is lower than the activity temperature (4° C.) of snakes. Accordingly, the system determines this is an abnormal situation. The abnormality behavior information 1202 notifies the abnormality notification system 13 to output an environment abnormality notification (warning of potential earthquake). Moreover, the abnormality notification system 13 further sends this event (the environment event information) to the correction unit 123. The correction unit 123 will also receive the environment information sent from the information feedback system 14. If the environment information sent from the information feedback system 14 to the correction unit 123 indicates that there is no drastic change in the earth's crust within this region after a predicted time, the judgment result (the environment event information) from the correction unit 123 does not match the environment information indicating that there is no earthquake in this region.

In both of the above two situations, the judgment result of the judgment system 12 does not match the real event in the region (the judgment result is incorrect), and the correction unit 123 sends a feedback information to the machine learning system 122 to modify the behavior data according to the feedback information. For example, the machine learning system 122 can modify the weights of the normal behavior information 1201 and the abnormal behavior information 1202 in the biological information database 120 in the judgment procedure according to the feedback information. Accordingly, the judgments for the future events made by the notification system 1 can be more correct.

In addition, the present embodiment also discloses a notification method of environment abnormality, which is applied to the above notification system 1 of environment abnormality to perform the judgment and issue notification. The detailed components and the relations between the components of the notification system 1 will not be described again.

Figure 3:
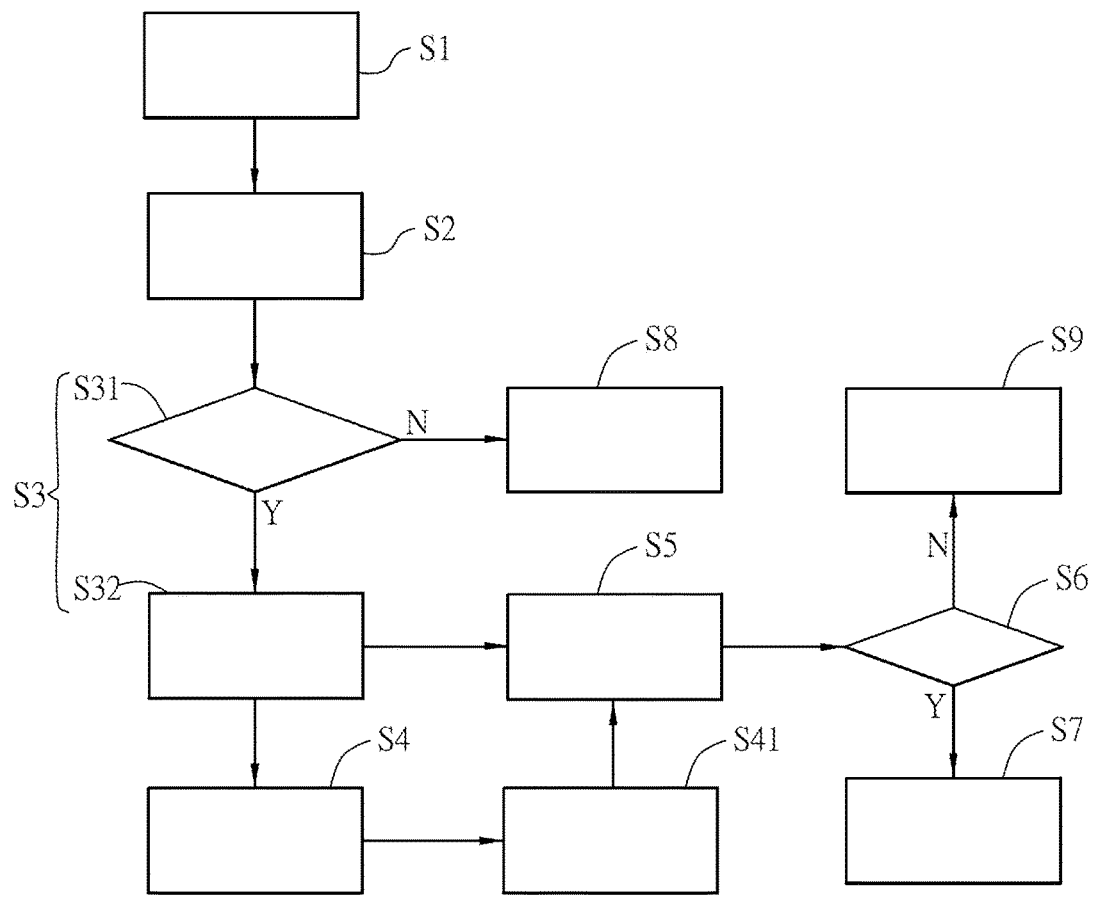
FIG. 3 is a flow chart of a notification method of environment abnormality according to an embodiment of the invention.

FIG. 3 is a flow chart of a notification method of environment abnormality according to an embodiment of the invention. The notification method includes the following steps.

A step S1 is to install a plurality of sensors 11 on a plurality of individuals of a creature D, and to collect position data of individuals of the creature D through the network system 10.

A step S2 is to send the position data of the individuals collected by the sensors 11 to the judgment system 12. The judgment system 12 includes an identification unit 121 and a biological information database 120. The biological information database 120 contains a plurality of behavior data. The behavior data include at least a normal behavior information 1201 and at least an abnormal behavior information 1202 of the creature D. The identification unit 121 receives the position data of the individuals from the sensors 11.

The step S3 is to process the position data of the individuals by the identification unit 121, and to compare the position data of the individuals with the behavior information stored in the biological information database 120. If the position data of the individuals match the abnormal behavior information, the step S4 is then performed to notify the abnormality notification system 13 to output an environment abnormality notification. Otherwise, if the position data of the individuals match the normal behavior information, the identification unit 121 performs the step S5 to send an environment event information to the correction unit 123.

The identification unit 121 includes a type identification unit 1211 and an abnormality identification unit 1212. The step S3 can further include a step S31 and a step S32. In the step S31, the type identification unit 1211 processes the position data of the individuals to generate a moving type data and then compares the moving type data with the behavior data. If the moving type data match one of the behavior data, the moving type data are sent to the abnormality identification unit 1212.

In the step S32, the abnormality identification unit 1212 further compares the moving type data with the abnormal behavior information. If the moving type data match the abnormal behavior information 1202, the step S4 is performed to notify the abnormality notification system 13 to output the environment abnormality notification. In the step S41, the abnormality notification system 13 sends the environment event information to the correction unit 123.

In addition, the notification method further includes the following step. If the moving type data does not match any of the behavior data in the step S31, the step S8 is performed to send the moving type data to the machine learning system 122, and the machine learning system 122 records the moving type data in the biological information database 120.

In this embodiment, the notification method further includes the following steps of: sending an environment information from the environment information feedback system 14 to the correction unit 123 (step S6); sending an environment event information from the identification unit 121 or the abnormality notification system 13 to the correction unit 123; comparing the environment information with the environment event information by the correction unit 123; and when the environment event information does not match the environment information, sending a feedback information to the machine learning system 122, and the machine learning system 122 modifies the behavior data according to the feedback information (step S9). When the environment event information matches the environment information, the step S7 is performed to end this procedure.

If the step S32 determines that the moving type data match the normal behavior information, the abnormality identification unit 1212 performs the step S5 to output the environment event information to the correction unit 123.

In the step S6, when the environment event information sent from the abnormality notification system 13 to the correction unit 123 does not match the environment information, an environment phenomenon corresponding to the environment event information does not happen. Alternatively, when the environment event information sent from the abnormality identification unit 1212 to the correction unit 123 does not match the environment information, an environment phenomenon corresponding to the environment event information does happen.

In summary, the notification system and method of environment abnormality of the embodiment collect the position data of individuals by the sensors through a network system (e.g. IOT system), and the activities or movements of the group of animals can be monitored in real time and the required information can be rapidly retrieved. In addition, the identification unit can compare the position data with the behavior information stored in the biological information database. If the position data of the individuals match the abnormal behavior information, the identification unit notifies the abnormality notification system to output an environment abnormality notification. Compared to the conventional art that observes the activities of animals by images, the notification system and method of environment abnormality of the embodiment can directly retrieve the desired information without the complex image identification and conversion, thereby reducing the total calculation time and decreasing the misjudgment.

In one embodiment, the notification system of environment abnormality further includes a machine learning system, a correction unit and an environment information feedback system. The correction unit can determine whether the judgment result of the abnormality notification system matches the real situation or not, and the machine learning system can perform the feedback control and modify the behavior data stored in the biological information database. For example, the weights of the normal behavior information and the abnormal behavior information in the biological information database can be modified according to the feedback information. Accordingly, the judgments for the future events can be more correct.

Although the embodiment has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the embodiment.

What is claimed is:

1. A notification system of environment abnormality, comprising:
    a network system;
    a plurality of sensors configured to a plurality of individuals of at least one creature, respectively, and collecting position data of the individuals through the network system;
    a judgment system comprising an identification unit and a biological information database, wherein the biological information database contains a plurality of behavior data, the behavior data comprise at least a normal behavior information and an abnormal behavior information of the creature, and the identification unit receives the position data of the individuals from the sensors; and
    an abnormality notification system communicating with the identification unit;
    wherein the identification unit compares the position data of the individuals with the behavior information stored in the biological information database, and when the position data of the individuals match the abnormal behavior information, the identification unit notifies the abnormality notification system to output an environment abnormality notification;
    wherein the notification system further comprises an environment information feedback system, wherein the judgment system further comprises a machine learning system and a correction unit, the correction unit receives an environment information from the environment information feedback system, and compares the environment information with an environment event information sent from the identification unit or the abnormality notification system to the correction unit, and when the environment event information does not match the environment information, a feedback information is sent to the machine learning system, and the machine learning system modifies the behavior data according to the feedback information.

2. The notification system of claim 1, wherein the identification unit comprises a type identification unit and an abnormality identification unit, the type identification unit processes the position data of the individuals to generate a moving type data and then compares the moving type data with the behavior data.

3. The notification system of claim 2, wherein when the moving type data match one of the behavior data, the moving type data are sent to the abnormality identification unit.

4. The notification system of claim 3, wherein the abnormality identification unit further compares the moving type data with the behavior data, and when the moving type data match the abnormal behavior data, the abnormality identification unit notifies the abnormality notification system to output the environment abnormality notification.

5. The notification system of claim 2, wherein the judgment system further comprises a machine learning system, and when the moving type data does not match any of the behavior data, the moving type data is sent to the machine learning system, and the machine learning system records the moving type data in the biological information database.

6. The notification system of claim 1, wherein the identification unit comprises a type identification unit and an abnormality identification unit, the type identification unit processes the position data of the individuals and then generates a moving type data, and when the moving type data match the normal behavior information, the abnormality identification unit outputs the environment event information to the correction unit.

7. The notification system of claim 1, wherein when the environment event information is sent from the abnormality notification system to the correction unit, the environment event information does not match the environment information means that an environment phenomenon corresponding to the environment event information does not happen.

8. The notification system of claim 1, wherein when the environment event information is sent from the abnormality identification unit to the correction unit, the environment event information does not match the environment information means that an environment phenomenon corresponding to the environment event information does happen.

9. The notification system of claim 1, wherein the sensors are passive sensors.

10. A notification method of environment abnormality, comprising steps of:
    collecting position data of a plurality of individuals of at least one creature by a plurality of sensors configured to the individuals, respectively, through a network system;
    sending the position data of the individuals collected by the sensors to a judgment system, wherein the judgment system comprises an identification unit and a biological information database, the biological information database contains a plurality of behavior data, the behavior data comprise at least a normal behavior information and an abnormal behavior information of the creature, and the identification unit receives the position data of the individuals from the sensors;
    processing the position data of the individuals by the identification unit, and comparing the position data of the individuals with the behavior information stored in the biological information database; and
    notifying an abnormality notification system to output an environment abnormality notification when the position data of the individuals match the abnormal behavior information;
    wherein the judgment system further comprises a machine learning system and a correction unit, and the notification method further comprises steps of:
    sending an environment information from an environment information feedback system to the correction unit;

sending an environment event information from the identification unit or the abnormality notification system to the correction unit;

comparing the environment information with the environment event information by the correction unit; and sending a feedback information to the machine learning system when the environment event information does not match the environment information, and modifying the behavior data according to the feedback information by the machine learning system.

11. The notification method of claim 10, wherein the identification unit comprises a type identification unit and an abnormality identification unit, and the type identification unit processes the position data of the individuals to generate a moving type data and then compares the moving type data with the behavior data.

12. The notification method of claim 11, further comprising a step of sending the moving type data to the abnormality identification unit when the moving type data match one of the behavior data.

13. The notification method of claim 12, wherein the abnormality identification unit further compares the moving type data with the abnormal behavior information, and when the moving type data match the abnormal behavior data, the abnormality identification unit notifies the abnormality notification system to output the environment abnormality notification.

14. The notification method of claim 11, wherein the judgment system further comprises a machine learning system, and the notification method further comprises a step of: sending the moving type data to the machine learning system, and recording the moving type data into the biological information database by the machine learning system when the moving type data does not match any of the behavior data.

15. The notification method of claim 10, wherein the identification unit comprises a type identification unit and an abnormality identification unit, the type identification unit processes the position data of the individuals and then generates a moving type data, and when the moving type data match the normal behavior information, the abnormality identification unit outputs the environment event information to the correction unit.

16. The notification method of claim 10, wherein in sending the environment event information from the abnormality notification system to the correction unit, the environment event information does not match the environment information means that an environment phenomenon corresponding to the environment event information does not happen.

17. The notification method of claim 10, wherein in sending the environment event information from the abnormality identification unit to the correction unit, the environment event information does not match the environment information means that an environment phenomenon corresponding to the environment event information does happen.

18. The notification method of claim 10, wherein the sensors are passive sensors.

* * * * *